(12) United States Patent
Naumann (10) Patent No.: US 8,020,293 B2
(45) Date of Patent: *Sep. 20, 2011

(54) METHOD FOR MACHINING THE BEARING SEATS OF THE MAIN AND ROD BEARINGS OF CRANKSHAFTS

(75) Inventor: Hans Naumann, Albany, NY (US)

(73) Assignee: Niles-Simmons Industrieanlagen GmbH, Chemnitz (DE)

( * ) Notice: Subject to any disclaimer, the term of this patent is extended or adjusted under 35 U.S.C. 154(b) by 74 days.

This patent is subject to a terminal disclaimer.

(21) Appl. No.: 12/275,466

(22) Filed: Nov. 21, 2008

(65) Prior Publication Data

US 2009/0116921 A1    May 7, 2009

Related U.S. Application Data

(63) Continuation of application No. PCT/EP2007/004604, filed on May 24, 2007.

(30) Foreign Application Priority Data

May 26, 2006 (DE) .......................... 10 2006 024 715

(51) Int. Cl.
*B23C 3/06* (2006.01)

(52) U.S. Cl. ....... 29/888.08; 29/558; 409/132; 409/199; 409/166

(58) Field of Classification Search ............ 29/557–558, 29/6.01, 888.08, 34 R, 33 C, 888.1; 409/131–132, 409/199–200, 165–166; *B23C 3/06*
See application file for complete search history.

(56) References Cited

U.S. PATENT DOCUMENTS

| 5,001,917 | A  | 3/1991 | Berstein |
| 5,138,859 | A  | 8/1992 | Winkens |
| 5,765,270 | A  | 6/1998 | Schrod et al. |
| 6,684,500 | B1 | 2/2004 | Kohlhase et al. |

(Continued)

FOREIGN PATENT DOCUMENTS

CS    AT286067    11/1970

(Continued)

OTHER PUBLICATIONS

International Search Report dated May 10, 2007, for the corresponding International Application PCT/EP2007/004604.

(Continued)

*Primary Examiner* — Erica E Cadugan
(74) *Attorney, Agent, or Firm* — Katten Muchin Rosenman LLP (57) ABSTRACT

The invention relates to a method of machining the bearing seats of main and rod bearings (HL, PL) of crankshafts (1), in which the bearing seats (30) of the main and rod bearings (HL, PL), after the primary forming of the crankshaft (1) by forging or casting, are subjected to the following processing operations: forming by machining with a specific cutting edge, deep rolling all fillets or recesses of the main and rod bearings, straightening of the crankshaft (1), precision machining with an end-milling cutter (12) in each case by high-speed roughing-cut turn-milling and finishing-cut turn-milling, smooth rolling of the bearing seats of the crankshaft after the finishing-cut turn milling, wherein the roughing-cut turn-milling and the finishing-cut turn-milling is effected during in each case an essentially complete revolution of the crankshaft (1) without longitudinal feed and without tangential feed of the end-milling cutter (12).

12 Claims, 9 Drawing Sheets

U.S. PATENT DOCUMENTS

| | | |
|---|---|---|
| 2006/0143888 A1 | 7/2006 | Heimmann |
| 2008/0008550 A1 * | 1/2008 | Naumann et al. .............. 409/132 |

FOREIGN PATENT DOCUMENTS

| | | | | |
|---|---|---|---|---|
| DE | 212950 | | | 9/1909 |
| DE | 4446475 | | | 6/1996 |
| DE | 197 49 939 | | | 5/1999 |
| DE | 10245071 | | | 4/2004 |
| DE | 10308124 | | | 9/2004 |
| DE | 102004042707 | | | 4/2006 |
| DE | 102004057111 | A1 | * | 6/2006 |
| EP | 0299111 | | | 1/1989 |
| EP | 0461293 | | | 12/1991 |
| EP | 1030755 | | | 8/2000 |
| EP | 1428612 | | | 6/2004 |
| GB | 1410568 | A | * | 10/1975 |
| JP | 2003-165011 | A | * | 6/2003 |
| WO | 9732680 | | | 9/1997 |
| WO | 2004014600 | | | 2/2004 |
| WO | 2006056460 | | | 6/2006 |

OTHER PUBLICATIONS

"Crankshaft Machining Technologies for Improving Quality and Fatigue Life", Jan. 1983, Hegenscheidt Product Infodrmation, Germany.

* cited by examiner

METHOD FOR MACHINING THE BEARING SEATS OF THE MAIN AND ROD BEARINGS OF CRANKSHAFTS

CROSS REFERENCE TO RELATED APPLICATION

This application is a continuation of International Application PCT/EP2007/004604 filed on May 24, 2007, pending at the time of filing of this continuation application and claims priority from German Patent Application 10 2006 024 715.9 filed May 26, 2006, the contents of which are herein wholly incorporated by reference.

BACKGROUND OF THE INVENTION

Field of the Invention

The invention relates to a method for machining the bearing seats of the main and rod bearings of crankshafts, wherein the bearing seats of the main and rod bearings are subjected to a plurality of machining operations after primary forming of a crankshaft by forging or casting.

Conventionally, the bearing seats of the main and rod bearings of crankshafts are machined by chip removal in several stages. According to a machining sequence that is typical in this regard, the bearing seats of the forged or cast crankshaft are first rough-machined by turning, milling or turn-broaching, then are semifinish-machined by grinding and finally are subjected to finish machining. Especially to protect the bearing seats from damage in the course of further manufacture, the machining regularly also includes hardening followed by grinding, in order to adjust the bearing seats to their final size after they have been hardened.

For example, a brochure of the Hegenscheidt Co. of Erkelenz issued with the title "Crankshaft Technology—Machining to Increase Quality and Useful Life" in 1983, describes a "Machining sequence for 4-cylinder, 5-bearing passenger-car crankshafts" (hereinafter this document is abbreviated as Do).

The known machining sequence comprises 25 operations for complete machining of a crankshaft (see Do, pages 8 and 9). Not all listed machining operations are of interest for the present invention. What are of interest here are operations 04, 05, 06, 09, 10, 11, 12, 13, 14 and 22 a. Operations 04 to 06 can be grouped under the definition of "Forming by chip-removing machining with specific cutting edges". As an alternative to operations 09 and 10, corresponding to hardening and stress relief, there is specified operation 22 a, smooth-rolling, or in other words strengthening of the unhardened surfaces of the bearing seats. In each case these alternatives are followed by finish grinding of the bearing seats of the main and rod bearings in steps corresponding to operations 13 and 14.

Turn-milling of the bearing seats of crankshafts has also been proposed repeatedly, for example in DE 212950 and AT 286067. In each of these patents, an end-milling cutter rotating around an axis disposed at right angles to the axis of the bearing seat to be machined is moved with tangential feed along the rotating workpiece. More recently, such suggestions have been re-embraced, especially in order to avoid the grinding sludge produced during grinding.

For example, WO 97/32680 A1 (hereinafter this document is abbreviated as D1) proposes a method that manages without regrinding for machining the bearing seats of crankshafts, wherein the crankshaft is rotated at approximately 20 to 100 revolutions per minute by means of a holding device in which it is clamped and is mounted to be driven in rotation around its longitudinal axis, which coincides with the C-axis of the machine, and is machined with a milling tool that in a tool spindle can be rotated around its A-axis—parallel to the X-axis of the machine, that can be brought up to the workpiece along its X-axis and that can be displaced at right angles to its X-axis (in the Y-direction of the machine; tangential to the workpiece). The corresponding machining therefore takes place in two steps.

According to the explanations, in order to take into account the different stresses and strains on the cutting tool and the quality to be achieved in the machining operation, the tangential feed speed is supposedly controlled in such a way that, during the rough-machining phase (roughing), the circumferential cutting edges of the milling tool have optimal cutting conditions, and, during finish machining (smoothing) of the bearing seat, the axial cutting edges can encompass the entire bearing seat (see D1, page 11, lines 11 to 25). By appropriately high speeds of the turn-milling tool, the high cutting speeds necessary for high-speed cutting can be achieved and the crankshaft can nevertheless be rotated with the usual speed of up to approximately 100 rpm that is also used during grinding to achieve high quality of the workpiece. Because of the high cutting speeds, the stresses and strains in the workpiece are supposedly small, and very good three-dimensional geometry can be achieved. With a tool matched to the contour of the bearing seat, the tangential feed of the turn-milling tool supposedly permits machining of the entire width of the bearing seat in one work cycle. The conventional steps of rough-machining and grinding-machining of the bearing seats supposedly can be combined—in one machine and with one clamping of the crankshaft—in one working step, thus achieving considerable streamlining. Three cutting tips, composed of common types of cutting materials and each having an axial cutting edge and a circumferential cutting edge, are provided on the milling tool. As regards transition radius, flat shoulder, etc., the cutting-tip geometry is matched to the geometry of the bearing seat to be machined (see D1 page 6, line 33 to page 7, line 5).

In view of the throw of the crankshaft, the known turn-milling tool must be very elongated (overhang length) in order to permit machining of the bearing seat to be undertaken (see D1 page 8, lines 18 to 20).

In summary, what is proposed in D1 is a method and a device which, by using high-speed turn-milling, are supposed to make short cycle times and very good quality possible in machining of bearing seats of crankshafts, so that the machining step of grinding can be completely avoided (see D1, page 15, lines 22 to 27). The only distinction is between automobile crankshafts, which can be forged or cast, and large heavy crankshafts, such as for ship engines (see D1 page 1, paragraphs 1 and 2, page 2, paragraph 2 and page 3, paragraph 1). It is not known whether the crankshafts designated in this way are hardened or have undergone any other type of strengthening of the surface of the bearing seats. However, the person skilled in the art is aware that large technological differences exist between the machining of crankshafts for passenger cars and of crankshafts for ship engines. Thus it must be doubted whether the teaching of D1 can be applied without restriction to all types of crankshafts without requiring the person skilled in the art to achieve a further inventive step in this regard.

As a rough estimate, approximately 25% of crankshafts produced for passenger cars are unhardened. In approximately 50% of all crankshafts produced for passenger cars, the bearing seats are hardened. Approximately 25% of the crankshafts produced for passenger cars also have hardened transitions between bearing seat and crankweb or hardened undercuts.

EP1030755 B1 (hereinafter this document is abbreviated as D2) teaches the machining of crankshafts by the sequence of machining steps comprising chip removal—hardening—chip removal—finishing. For this purpose it is explained that, especially for steel crankshafts, the faces of the bearing seats are hardened in their near-surface zones. This achieves increased wearing resistance of the bearing seats, prevention of damage to these bearing seats during handling throughout the entire manufacturing process and also an influence on the strength characteristics of the crankshaft (see D2 column 1, lines 23 to 30). The technical starting point of the ideas of D2 is the conventional machining of crankshafts in four steps: the first step is chip-removing machining with specific cutting edges; turn-milling, and especially high-speed turn-milling, is mentioned in this connection. In the next, second machining step, the bearing seats of the crankshaft are hardened. The third step concerns grinding by means of a hard, massive grinding tool, such as a grinding disk. In the fourth step, finishing is finally applied by a grinding belt or grindstone, which is usually stationary and is pressed against the outside circumference of the rotating bearing seats of the crankshaft. The material allowance removed during finishing ranges from 1 to 10 μm (see D2 column 2, line 32 to column 3, line 15).

In order to lower the costs of crankshaft machining, it is endeavored according to D2 to reduce the machining of the bearing seats from four to three different machining steps (see D2 column 3, lines 21 to 24). By omitting grinding machining, the machining sequence is reduced from four to only three machining processes that are different in principle. Supposedly disposal problems for elimination of grinding sludge should cease to exist, investment costs for grinding machines and costs for tool consumption would no longer be incurred, and last but not least, a larger inventory of workpieces would no longer be needed to compensate for the prolonged turn-around time of the workpieces caused by grinding. In contrast, the disposal of chips from chip-removing machining is supposedly unproblematic, since either dry cutting (high-speed milling) is used or complete separation of the chips and oil is possible because of the much smaller specific surface of the chips compared with grinding dust (see D2 column 4, lines 21 to 33).

A further consideration relevant to the grinding of bearing seats that has been practiced heretofore is that the roundness deviations resulting from chip-removing rough-machining are usually reduced only in their absolute size but not in their nature by grinding. Thus grinding would not reduce long-period roundness deviations to short-period roundness deviations, but instead the number of waviness valleys in the shaft would either remain the same or even decrease, with the consequence that further improvement of the roundness deviations by finishing, considered as an improvement in the result per unit time, would actually become more difficult during finishing (see D2 column 7, line 49 to column 8, line 3).

According to D2, hardening is followed by further material removal by chip-removing machining, especially the second chip-removing machining step (finish chip removal) of a two-stage chip-removing cutting process (see D2 column 9, lines 20 to 24).

What the comments of D1 and D2 have in common is therefore that multi-stage turn-milling machining of the bearing seats by grinding is avoided. As explained, the quality of manufacture is supposedly increased and the costs that would be incurred for disposal of the grinding sludge are lowered, even for hardened (see D2) bearing seats. Because of this, the unanimous, known interpretation is that multi-stage turn-milling machining should be integrated into rough-machining. This interpretation is not invalidated even by the fact that, as the possible combination of machining sequences up to the ready-to-use condition of a crankshaft, there is mentioned the following: chip removal—hardening—chip removal—finishing (see D2 column 4, lines 50 to 54).

German Patent 4446475 also relates to a method for machining the bearing seats of the main bearings and rod bearings of crankshafts and, although not mentioned expressly in that reference document, it can be assumed that forming of the crankshaft by forging or casting precedes machining of the corresponding bearing seats. This document teaches turn-milling machining of the rod bearings; in contrast, the machining of the main bearings of the crankshaft supposedly takes place expressly by turn-broaching or turn/turn-broaching instead of by turn-milling. According to the reference document, expressly only the "eccentric workpiece faces", or in other words the rod bearings, are supposedly subjected to turn-milling machining.

The present invention is based on the knowledge that, starting from the structural complexity of crankshafts and other shafts having bearing seats, especially eccentric bearing seats, optimization of manufacturing costs and working result cannot be achieved with the known measures alone. Its object was to provide, for machining the bearing seats of main and rod bearings of crankshafts, a method and a machine tool capable of contributing to the manufacture of high-grade crankshafts at comparatively low costs. According to the invention, this object is achieved by a method for machining the bearing seats of the main and rod bearings of crankshafts, wherein the bearing seats of the main and rod bearings, after primary forming of the crankshaft by forging or casting, are subjected to the following machining operations:

forming by chip-removing machining with specific cutting edges,
  deep-rolling of all fillets or undercuts of the main and rod bearings,
  straightening-rolling of the crankshaft,
  chip-removing precision machining with an end-milling cutter, respectively by
    roughing-cut turn-milling and
    finishing-cut turn-milling and
    smooth-rolling of the bearing seats of the crankshaft after finishing-cut turn-milling.
an appropriately set-up machine tool belonging to the execution of the method
wherein the roughing-cut turn milling and the finishing-cut turn-milling respectively take place during substantially one complete revolution of the crankshaft without longitudinal feed and without tangential feed of the end-milling cutter.

If the crankshaft is also hardened between forming with chip-removing cutting edges and deep-rolling of the fillets and undercuts, the hardening of the bearing seats is also followed by a multi-stage process of chip-removing machining with specific cutters by turn-milling with a roughing cut and a finishing cut, wherein the orientation of the end-milling cutter relative to the axis of the bearing to be machined does not change during each revolution in question of the crankshaft, or in other words between the lead-in cut and the exit of the end-milling cutter. Because of the density and hardness of the material to be removed and the multi-stage nature of turn-milling machining, there are produced only relatively small annealed chips, which are dry and can be disposed of without problems. By the fact that the crankshaft is rotated, in terms of order of magnitude, only by approximately one complete revolution during roughing-cut turn-milling as well as during finishing-cut turn-milling respectively, which includes rotation of the crankshaft by approximately one and one half complete revolutions, as will be explained in more detail hereinafter, the turn-milling machining can be completed within minimal time.

The technology of smooth rolling is a chipless ultra-precision surface machining treatment for all plastically deformable metal materials. Machining takes place by means of hardened working rolls polished to a high gloss, with relatively low contact pressure against the rotating crankshaft. During the smooth rolling process, plastic deformation takes place in the skin layer of the material, wherein the raised zones of the profile are leveled by plastic yielding and the peaks are also leveled until partial or complete leveling has been accomplished. The microstructure before and after smooth rolling clearly shows that no overlapping takes place.

The advantages of the smooth rolling technology compared with all other technologies for improving the surface quality of highly stressed workpieces are:
uniform surface machining,
high percentage contact area,
low tool costs,
long tool service life,
hardness increase in the skin layer,
increase of torsional strength and
prolonged useful life.

The technology of deep rolling is similar to smooth-rolling technology, but its objective is completely different. The working rolls applied with deep-rolling force follow the contours of the workpiece. When the method is used in the undercut, the deep-rolling force of the rolls can be automatically regulated—as a function of angle, and, in fact, within each revolution of the crankshaft—between preselectable minimal and maximal pressures over the entire circumference of the diameter to be machined. The number of overrolling cycles is preselectable.

The increase achieved in fatigue strength depends on material, radial size, rolling force and number of rolling cycles over the undercuts.

The advantages of deep-rolling are:
increase in skin-layer hardness,
introduction of compressive stresses,
form of the geometry to be deep-rolled corresponding to the specified requirement.

As regards deep-rolling methods, a distinction is made between
feed methods and the
plunge-cut method.

During turn-milling according to the present invention, the axis of the end-milling cutter is offset relative to the axis of the bearing seat to be machined by an eccentricity that is maintained, or in other words is constant, throughout the corresponding machining steps, including the phases of insertion and retraction of the tool. During turn-milling, no feed movement of the end-milling cutter takes place perpendicular to a longitudinal axis, or in other words in the Y-direction or tangential to the workpiece. The machining speed (relative feed) depends solely on the speed of revolution of the crankshaft and the radius of the bearing seat to be machined. As an example, the following machining speeds are achieved in the process: relative feed between 200 mm/min and 9000 mm/min, preferably between approximately 600 mm/min and 1500 mm/min; cutting speed between 60 m/min and 600 m/min, preferably between approximately 80 m/min and 180 m/min. The offset of the axis of the end-milling cutter relative to the axis of the bearing seat to be machined depends on the bearing geometry and corresponds to 0.1 to 0.25, preferably approximately 0.15 to 0.2 times the diameter of the end-milling cutter. Because of the eccentricity of the end-milling cutter, the axial cutting edges are able to cover the complete bearing seat. The eccentricity can be optimized to reduce the dynamics of the milling process (vibration behavior). Milling machining of the bearing seat can be achieved by climb or conventional milling for cutting-edge entrance.

According to a particular aspect of the present invention, the workpiece is gauged after roughing-cut turn-milling in the first machining stage, and the milling-cutter infeed for finishing-cut turn-milling in the second machining stage is determined as a function of the result of this measurement. It is important that suitable NC control be provided for semifinish-machining of each bearing seat. A prerequisite for such control is the presence of measuring devices and measuring programs, with which the machining result is recorded directly and used in the NC program of the machine for machining the bearing seats. Preferably the diameter is measured after the roughing cut of semifinish-machining and then the exact infeed needed for the final size is undertaken as the finishing cut. For this purpose, the surface geometry such as diameter, roundness, roughness and straightness is determined and used for the infeed in conjunction with a compensation strategy. The measurement is preferably performed with a contactless measuring instrument. After a first cut, one or more measuring instruments for measuring the main and rod bearings is or are used via a programmable NC axis. For this purpose, gauging of the bearing seats after roughing-cut turn-milling takes place on the clamped crankshaft, and so roughing-cut turn-milling, gauging and finishing-cut turn-milling are completed in a direct sequence. Depending on the individual circumstances, the allowance to be removed from the surface of the bearing seat can be the same or different in the respective individual steps of turn-milling machining of the bearing seats. In this regard the second option is usually particularly favorable, specifically because an allowance of 60 to 80%, preferably approximately 65% to 75% remaining after hardening is removed during roughing-cut turn-milling and the rest is removed during finishing-cut turn-milling. The division of allowance between the first and second machining stages depends on the working result of the first machining stage. If necessary, a minimum chip thickness (such as 0.1 mm) must be maintained during turn-milling. To determine the optimal division, between the two stages of turn-milling machining, of the allowance to be removed on the whole by turn-milling machining, it is advantageous to gauge the bearings of the crankshaft in the way explained in the foregoing even before high-speed roughing-cut turn-milling.

Depending on the surface-quality requirements as well as other boundary conditions, turn-milling will regularly be following by smooth rolling of the bearing seats. From the viewpoint of costs, however, a procedure without finishing is particularly preferred. In principle, this is also feasible, since the surface irregularities still remaining after finishing-cut turn-milling necessarily—because of the nature of the method—run not parallel but instead perpendicular to the movement direction in the bearing seat. Thus they are leveled more rapidly during operation, and the danger that the lubricant film will detach locally from them is smaller than in the case of radial circumferential marks in the bearing seat.

According to another preferred improvement of the invention, the infeed of the end-milling cutter during insertion at the beginning of roughing-cut turn-milling and at the beginning of finishing-cut turn-milling respectively has only an axial component relative to the axis of the end-milling cutter. In other words, infeed of the end-milling cutter takes place in each case along its longitudinal axis, and the cutter contacts the workpiece radially, while the crankshaft is rotated by a specific amount (see hereinafter). This is advantageous for avoiding the formation of a "dent" upon insertion of the end-milling cutter into the material to be removed. By the fact that dent formation is avoided in this way, the allowance present before turn-milling can be correspondingly small (for example, only 0.5 mm, meaning that r=0.25 mm to r=0.15 mm), with favorable effects for the economics of multi-stage precision turn-milling. It has proved particularly advantageous when the insertion of the end-milling cutter into the material to be removed at its position critical to roughing-cut turn-milling ranges over an angle of rotation of the crankshaft of approximately 3° to 15°, preferably approximately 5°. The same applies for insertion of the end-milling cutter during finishing-cut turn-milling.

In order to achieve the optimal roundness in the relationship with lead-in cut and exit of the end-milling cutter, fluctuations of the passive force over the tool spindle are compensated by means of sensor and actor systems. For this purpose the travels of the tool spindle in the Xm range from approximately 10 to 20 μm are corrected with piezo-elements. Automatic infeed correction by means of force measurement and orientation regulation of the X-axis to improve the roundness of precision turn-milled bearing seats is based on the principle of establishing equilibrium between the passive tool/workpiece forces during precision turn-milling machining. This is achieved by measuring the force in the tool spindle (axially relative to the tool) to determine the passive force. A relatively high sampling frequency of >1 kHz and computerized evaluation of two successive measured points is necessary for determination of the positive/negative increase of the force (including time signal $\Delta t$). What is needed is a faster X-axis drive, which can generate 10 to 20 μm (offset in time at known intervals: measuring frequency/calculating frequency/displacement frequency) also at >1 kHz, for example using piezo-elements.

The basic concept behind this is that, if the passive force changes due to hardness fluctuations or due to change of the cutting cross section (oil bore), the infeed of the tool in X-direction must be correspondingly corrected. Given sufficiently high resolution and speed of the X-axis drive within 10 to 20 μm (displacement window), the vibration influence can even be considerably reduced by entrance and exit of the cutting edge (principle of counter-vibration/canceling out the waviness peaks and waviness valleys).

In this connection, however, it must be kept in mind that the system tends to overshoots due to changes in passive force, which changes can be caused by the corrected displacement movement. For example, if the hardness decreases, the passive force also decreases therewith, and, if a "correction" is then applied in the +X path of the workpiece, the passive force decreases further and the system "blows up".

One possible solution comprises evaluating the force signal over longer time periods or integrally calculating the moving average and applying delayed corrections with pauses between the corrections. Nevertheless, the higher-frequency vibrations must be further reduced.

Another preferred improvement of the invention is characterized in that the cutting-edge diameter of the end-milling cutter used for turn-milling is larger than the width of the bearing seat to be machined. Preferably the diameter of the end-milling cutter used for turn-milling is approximately 1.15 to 1.35 times the width of the bearing seat to be machined. In this case a relief groove is expediently made during rough forming on each of the two sides of the bearing seat to be generated, in which groove the miller can run out during turn-milling machining. Taking these parameters into consideration, the resulting shape of the surface profile remaining on the surface of the bearing seats after turn-milling machining is more favorable for maintaining a lubricant film.

During machining of the bearing seats of a crankshaft, it is advantageous for multi-stage turn-milling machining if the crankshaft is clamped at its flange end in a first rotatable chuck and at its journal end in a second rotatable chuck. In this case, the two chucks preferably can be driven synchronously and rotate with a speed of revolution of between 1 and 100 rpm.

The bearing seats of the individual main bearings of a crankshaft are expediently machined successively with a single turn-milling tool, while the crankshaft preferably is braced simultaneously in radial direction by one or by two steadies on at least one adjacent main bearing. Correspondingly, the bearing seats of the individual rod bearings are expediently machined successively with a single turn-milling tool, while the crankshaft is braced simultaneously in radial direction by one steady on at least one of the main bearings adjacent to the machined rod bearing.

By bracing with steadies, it is ensured that the crankshaft will not sag under the machining forces and thus impair the machining result.

Alternatively, a plurality of main or rod bearings may each be machined simultaneously with a plurality of turn-milling tools. An appropriate plurality of turn-milling tools is provided for this purpose.

It is particularly advantageous for multi-stage turn-milling machining if each bearing seat is assigned its own individual NC control program. A prerequisite for such individual control is the presence of measuring devices and measuring programs, with which the individual machining result of roughing-cut turn-milling machining is recorded directly and used in the NC program of the machine for machining the bearing seat in question during finishing-cut turn-milling machining. As already explained, it is preferable to perform the measurement after the roughing cut of multi-stage turn-milling machining and then to adjust the infeed for the finishing cut. By virtue of modern developments, such complex NC control of the machine tool is now possible without difficulty.

Besides the machining of crankshafts for passenger-car engines as described hereinabove, it is also possible by analogy to machine crankshafts for larger engines, such as engines for small ships or for tanks or locomotives. Machining of camshafts or side shafts is also possible.

The invention also relates to a machine tool for performing the method. The machine tool has:
  a main spindle with an axis of rotation (C-axis) around the Z-axis, corresponding to the main axis of rotation of a shaft to be machined,
  a chuck that can be driven in rotation in the C-axis,
  at least one tool spindle that rotates around the X-axis, that can be displaced in the Y-direction and in the Z-direction and that can undergo infeed in the X-direction,
  at least one steady that can be displaced along the Z-direction with at least one bracing means for the crankshaft against one of its bearing seats,
  a tailstock with a lathe center or a second chuck,
  a device for deep-rolling the undercuts and fillets and for straightening-rolling crankshafts by means of deep-rolling tools, as well as
  a device for smooth rolling the bearing seats of main (HL) and rod (PL) bearings.

Besides such a machine for chip-removing machining of crankshafts, there are also provided separate machines or devices for deep-rolling the fillets or undercuts or for smooth-rolling the bearing seats on the main and rod bearings of crankshafts. To the extent that such devices are not already present on or cannot be attached to the machine tool for chip-removing machining, it is provided that the operations of deep-rolling and of smooth-rolling will be undertaken on stand-alone machines specialized for such purposes within the sequence of manufacturing operations.

During machining of the bearing seats of a crankshaft in a machine having two chucks capable of being driven in rotation, the first chuck receives the crankshaft at its flange and the second chuck receives the crankshaft at its pinion. Preferably compensation chucks with centering holder are used as chucks.

The axis of rotation (A-axis) of the tool spindle containing the turn-milling tool rotates around the X-axis in a manner orthogonal to the working plane of the machine. The tool spindle for the turn-milling tool is also provided with a device for making the tool spindle adjustable in the Y-direction of the machine for adjustment of an eccentricity (the offset) between the axis of the bearing seat to be machined and the tool axis. Finally, the tool spindle can also be displaced and immobilized in the Z-direction of the machine tool, in order to be able to machine the individual bearing seats successively.

For machining of surfaces of bearing seats of rod bearings, the tool spindle is provided with a device by means of which it can oscillate in coordinated manner in the direction of the X-axis, so that it can follow the circular movements of the rod bearing during rotation of the crankshaft around its main axis. A second "superposed" X-axis is provided for infeed up to 10 µm, for example, by means of piezo-elements. Thereby reduction of the process dynamics is also possible.

The tool spindle is preferably provided to hold an end-milling cutter, whose shank has a length-to-diameter ratio of between 10:1.5 and 10:3. This slenderness ratio of the end-milling cutter is the prerequisite for machinability of all surfaces of the bearing seats (cylindrical surfaces) with the tool while the crankshaft is being rotated. However, another prerequisite of this slenderness ratio is that the shank of the end-milling cutter have high bending stiffness. It is advantageous for the shank of the end-milling cutter to be made of metal carbide or of other materials with high bending stiffness. The end-milling cutter is preferably clamped in a shrink-fit chuck.

In order to achieve a smooth and uniform cut, there are preferably provided at least three axial cutting edges of CBN cutting tips (cubic crystalline boron nitride) or cutting tips of another suitable cutting material, fixed to the end-milling cutter by brazing or other suitable method. Each axial cutting edge of the end-milling cutter is preferably provided with a very small setting angle of between 0.02° and 0.08°. Such a setting angle permits the convex (crowned) form of the bearing surfaces that is favorable for crankshafts to be obtained. In particular, the setting angle that is capable of being generated in this way by oblique lead-in cut of the axial tool cutting edges can be approximately 0.04°. If necessary, the tool can be cooled internally.

Bracing of the respective bearing seats not currently being machined is preferably to be provided by a steady (see above), and is expediently achieved on a main bearing, at three points, one of which lies in the X direction (relative to the turn-milling tool). In order to rule out disturbances of the bracing effect due to the necessary oil bores in the main and rod bearings, the bracing faces of the steadies are preferably formed as sliding blocks, each of which can be provided with a recess in the form of a groove in the region of the oil bores of the main bearing seats. In addition, the sliding blocks can be adapted to the surface contour of the generating line of the bearing, especially via a negative crown matched to the bearing diameter. This achieves optimal bracing by maximizing the percentage contact area.

As explained in the foregoing, the special advantages of the present invention are evident in particular for crankshafts and other shafts having hardened bearing seats. However, if hardening of the bearing seats is not necessary either in regard to protection thereof during further treatment or in regard to the desired wear resistance, the inventive method can still be used without hardening the bearing seats. In this case, less stringent requirements would be imposed on the cutting edges of the turn-milling tool. In addition, the allowance for turn-milling machining could be smaller than for hardened bearing seats, since the warping that usually occurs during hardening would be absent, and this is favorable from the viewpoint of manufacturing economy.

The invention will be explained in more detail hereinafter on the basis of an exemplary embodiment.

In the drawings, which are not to scale and in some cases are greatly simplified.

Figure 9:
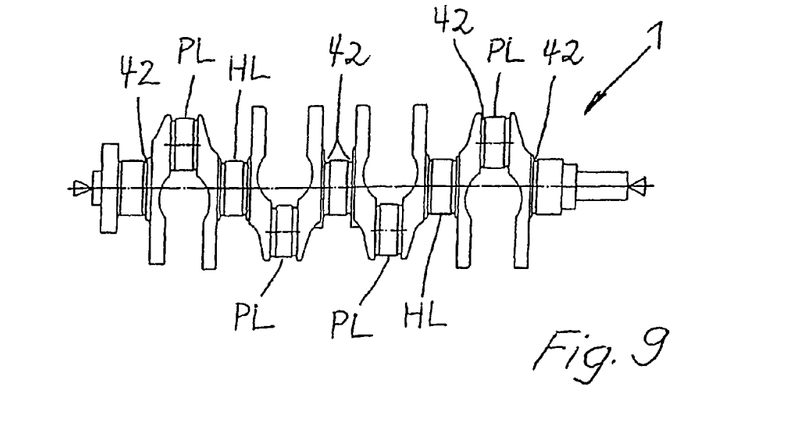
FIG. 9 shows the side view of a crankshaft with the preferred positions for deep-rolling.
Figure 10:
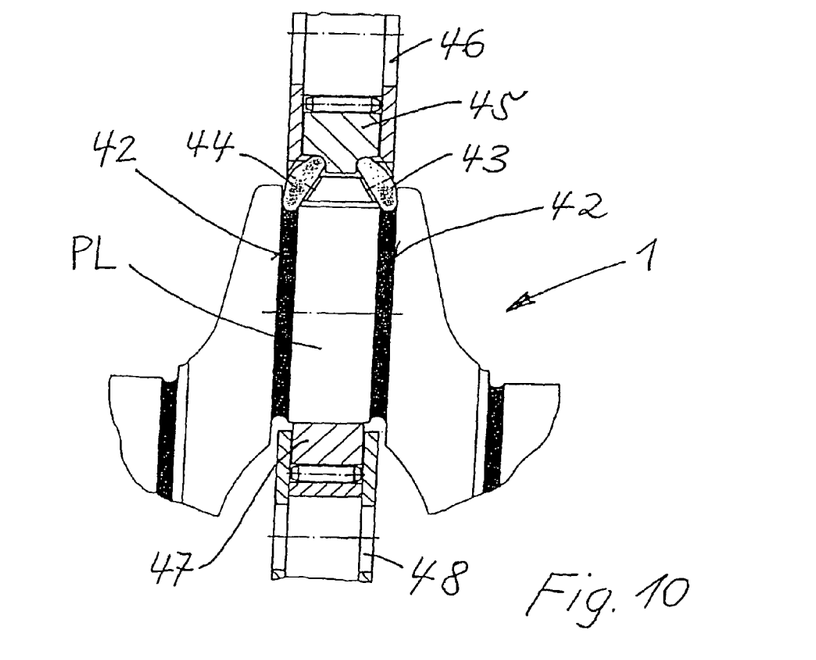
FIG. 10 shows the point of attack of a deep-rolling tool on a rod-bearing journal.

On crankshaft 1, (rough-)formed by chip-removing machining with specific cutting edges, the surfaces of all bearing seats and therewith usually also the transitions—fillets or undercuts—are first hardened, if this step is scheduled. Regardless, the next machining operation is deep-rolling of all fillets or undercuts 42 (FIG. 9). For this purpose, two deep-rolling rolls 43 and 44 are pressed under a predetermined deep-rolling force into undercuts 42 while crankshaft 1 is being rotated. During deep-rolling, deep-rolling rolls 43 and 44 are braced by a guide roll 45, which is mounted to rotate in a deep-rolling roll head 46 (FIG. 10). The bearing journal PL is braced against deep-rolling rolls 43 and 44 by two support rolls 47, which are mounted to rotate in a support roll head 48. Deep-rolling roll head 46 and support roll head 48 are parts of a deep-rolling tool (not shown).

Figure 1:
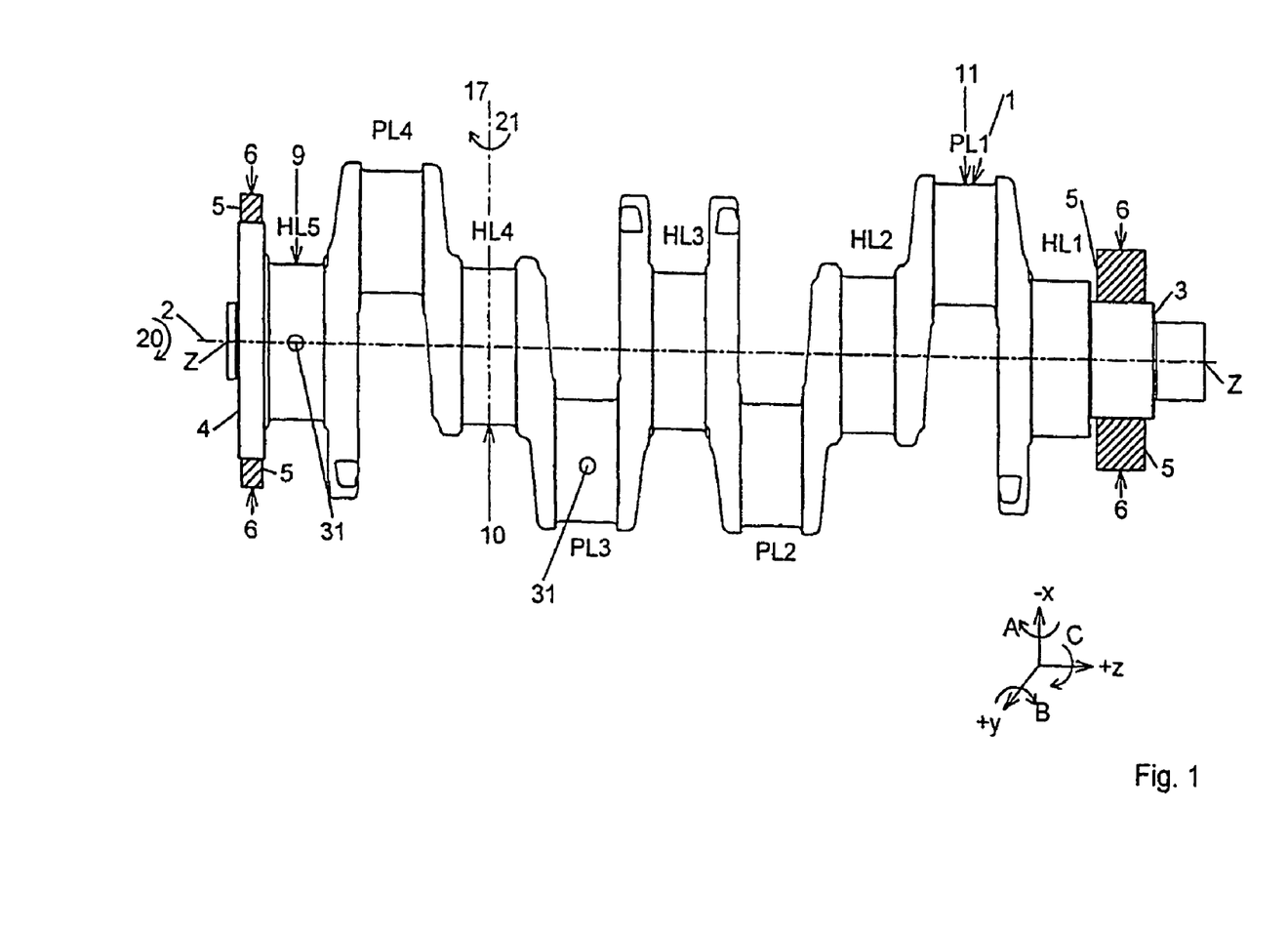
FIG. 1 shows a perspective view of a four-cylinder crankshaft.

If necessary, the crankshaft is straightened after hardening and/or deep-rolling of the fillets or undercuts 42. Straightening is accomplished with the same deep-rolling tools as for deep-rolling, but with regulation of the magnitude and direction of the deep-rolling force. Deep-rolling permits the fatigue strength of crankshafts of steel to be increased by 200% and of crankshafts of nodular cast iron to be increased by 300% relative to the original fatigue strength. Crankshaft 1, which was rough-formed by chip removal and is unhardened or hardened as well as deep-rolled and straightening-rolled, is clamped to rotate around its main axis of rotation 2 in a machine tool (not shown), in which the bearing seats of its main and rod bearings are now machined by precision turn-milling. Beginning at journal 3, the main bearings are designated successively as HL 1 to HL 5. The rod bearings are numbered similarly: beginning at journal 3, they are designated successively as PL 1 to PL 4 in the drawing. The end of crankshaft 1 opposite journal 3 is flange 4. In the present example, crankshaft 1 is clamped at flange 4 and journal 3 by one chuck at each end, two chuck jaws 5 of each being illustrated. As shown by the direction of arrows 6, the clamping forces act in radial direction on flange 4.

Axis of rotation 2 of crankshaft 1 is simultaneously the C-axis of the machine tool, running in Z-direction. Beginning at flange 4, main bearings HL 5 to HL 1 of crankshaft 1 are first machined successively according to arrow 9 by chip removal in a precision turn-milling process. During machining in the direction of arrow 9, which is the X-direction of the machine tool, crankshaft 1 is braced in the direction of arrow 10, which is opposite to machining direction 9. The bracing in the direction of arrow 10 is accomplished by one or two steadies (not shown) of the machine tool. In the process, HL 5 is machined with bracing at HL 4, HL 4 is machined with bracing at HL 3, HL 3 is machined with bracing at HL 4 and/or HL 2, HL 2 is machined with bracing at HL 3 and HL 1 is machined with bracing at HL 2. The bracing for machining of rod bearings PL 1 to PL 4 is similar. For machining of PL 1, for example in machining direction 11, bracing takes place at HL 1 and/or HL 2. In turn, the machining of PL 2 takes place with bracing at HL 2 and/or HL 3, the machining of PL 3 takes place with bracing at HL 3 and/or HL 4 and finally the machining of PL 4 takes place with bracing at HL 4 and/or HL 5. For simplicity, it is assumed that machining direction 11 corresponds to machining direction 9 and thus to the X-direction of the machine tool.

Figure 2:
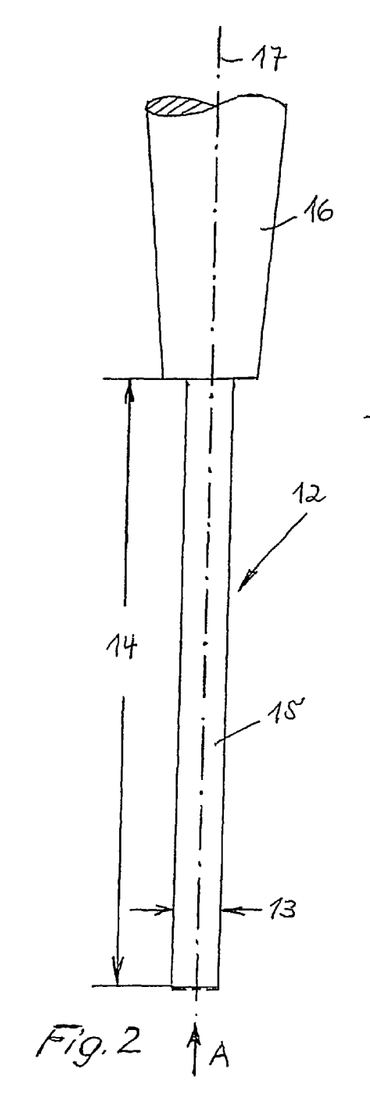
FIG. 2 shows a side view, on a reduced scale, of an end-milling cutter that can be used to machine the bearing seats of the crankshaft according to FIG. 1.

An end-milling cutter 12 is provided for precision turn-milling of bearing seats HL and PL (FIG. 2). In the present exemplary embodiment, diameter 13 of the end-milling cutter is 24 mm, whereas the width of main-bearing seats HL and of rod-bearing seats PL is 19 mm. Accordingly, during rough forming of crankshaft 1 by chip-removing machining, there was provided on each side of each bearing seat a relief groove of 2.5 mm, in which end-milling cutter 12 can run out. Shank 15 of end-milling cutter 12 has a large length 14 relative to its diameter 13. The large length 14 of shank 15 ensures, for example, that the surfaces of the bearing seats of rod bearing PL 1 or PL 4 can be machined from directions 9 and 11 even when—after approximately one half rotation of crankshaft 1—they are located in the lower position, in which the two inner rod bearings PL 2 and PL 3 are illustrated (FIG. 1). For this purpose, shank 15 of end-milling cutter 12 has high bending strength. Shank 15 is inserted into a standard tool holder 16 of the tool spindle (not shown) of the machine tool. At the same time, axis of rotation 17 of end-milling cutter 12 is disposed parallel to the X-direction of the machine tool.

Figure 3:
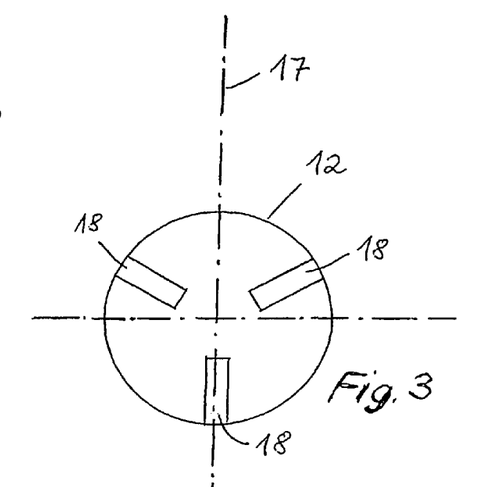
FIG. 3 shows a top view of the end-milling cutter of FIG. 2 in the direction of arrow A of FIG. 2 on an enlarged scale.
Figure 4:
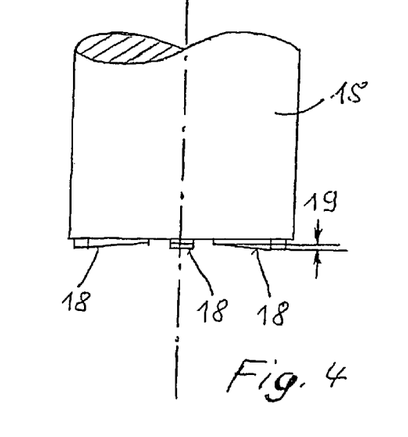
FIG. 4 shows the side view of the axial end of the end-milling cutter on an enlarged scale.

Viewed from the direction of arrow A, end-milling cutter 12 has three cutting tips 18 distributed uniformly over the circumference (FIG. 3). Cutting tips 18 are made of cubic crystalline boron nitride, abbreviated as CBN. The axial cutting edges of cutting tips 18 respectively have a small setting angle 19 in the direction of axis of rotation 17.

Figure 5:
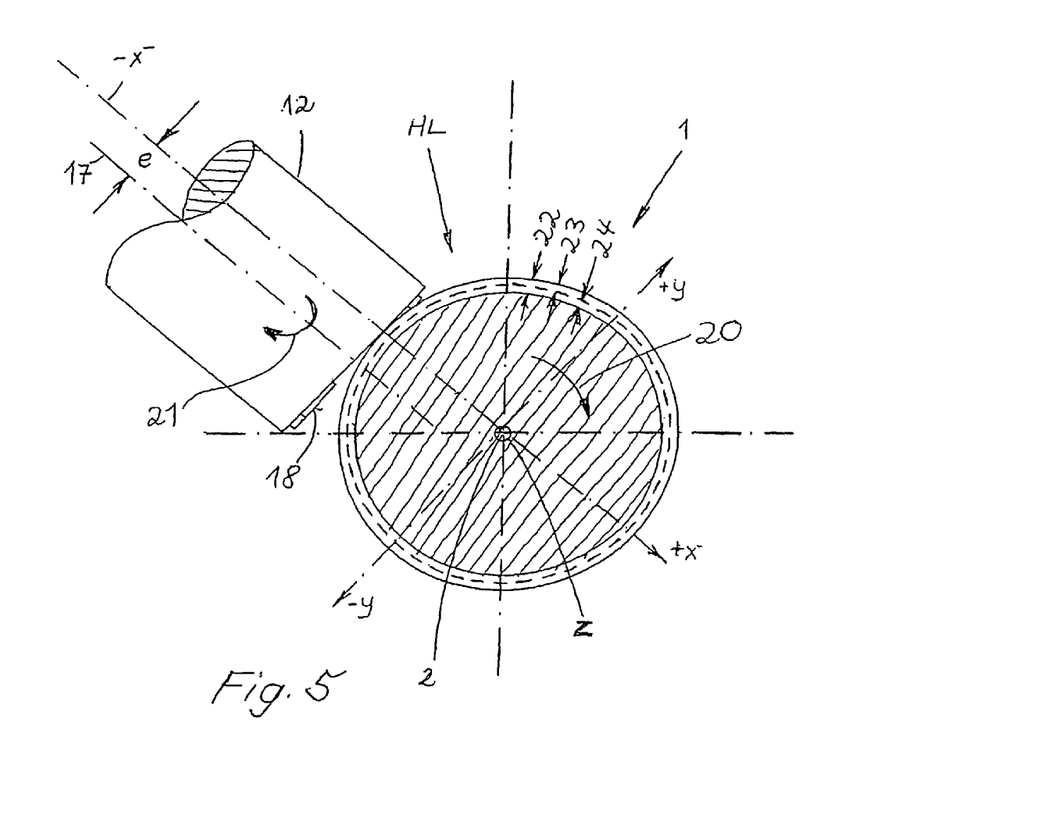
FIG. 5 shows the machining of a main bearing of the crankshaft of FIG. 1 in section.

FIG. 5 shows a section through an arbitrary main bearing HL of crankshaft 1. The C-axis of the machine tool lies in the direction of axis of rotation 2; thus the Z-axis is disposed perpendicular to the plane of the diagram. The X-axis extends orthogonally relative thereto, and the Y-axis in turn extends orthogonally relative to the X-axis and to the Z-axis (FIG. 1, bottom right). Axis of rotation 17 of end-milling cutter 12 is shifted in Y-direction relative to the X-axis by the offset e, which in the present exemplary embodiment is approximately 4 to 5 mm. The direction of rotation of crankshaft 1 is indicated by curved arrow 20 and the direction of rotation of end-milling cutter 12 is indicated by curved arrow 21.

Allowance 22 (for example, 0.25 mm) is provided for multi-stage chip-removing turn-milling machining of main bearing HL. During roughing-cut turn-milling, in which crankshaft 1 makes approximately one complete revolution in direction 20, an outer layer 23 of predetermined thickness (roughing allowance, for example 0.15 mm) is removed from main bearing HL. Immediately thereafter, or in other words without reclamping crankshaft 1, once the bearing has been gauged after roughing-cut turn-milling, inner layer 24 (finishing allowance, for example 0.1 mm) is removed by precision-cut turn milling, while crankshaft 1 is again rotated in direction of rotation 20 and end-milling cutter 12 is rotated in direction of rotation 21. Directions of rotation 20 and 21 may also be reversed for precision-cut turn-milling. During precision-cut turn-milling, crankshaft 1 makes somewhat more than one complete revolution. Together with the range of angle of rotation for insertion of end-milling cutter 12 at the beginning of the precision-cut turn-milling machining step, end-milling cutter 12 is engaged here over an angular range of approximately 420°.

Figure 6:
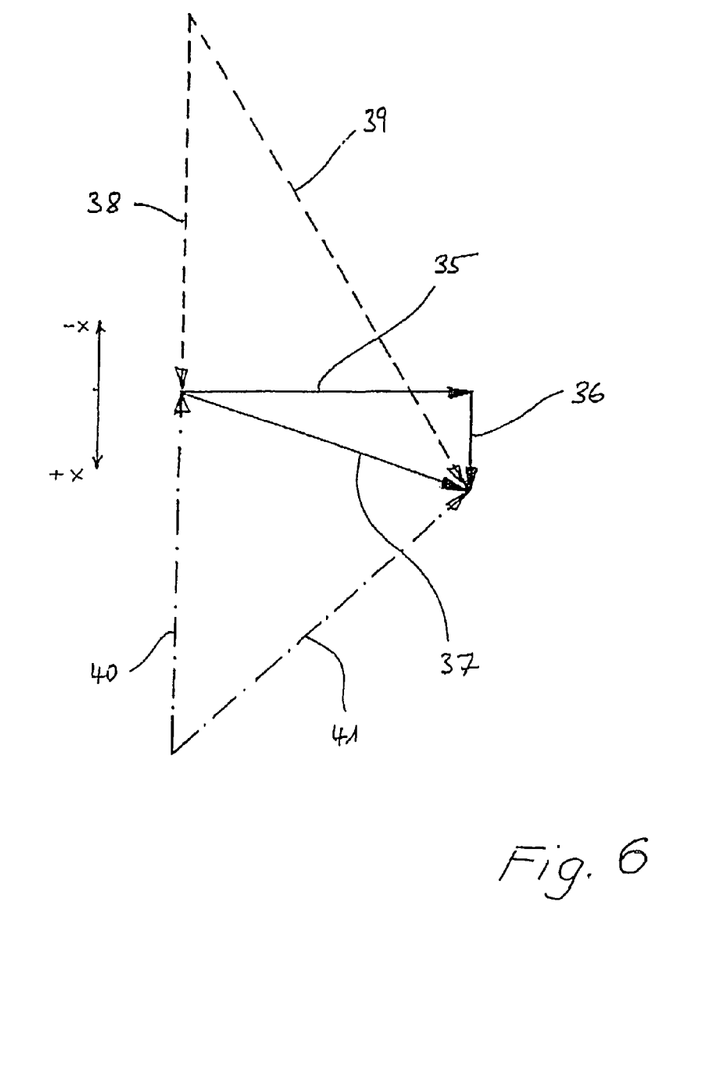
FIG. 6 shows a vector diagram of the relative feed during different phases of turn-milling machining.

By means of a vector diagram, FIG. 6 illustrates the relative feed during insertion (dashed) of end-milling cutter 12 in the material, or in other words during the lead-in cut, during rotation (solid) and during exit (dot-dash) of the end-milling cutter. Because of the geometry—only the diameter of the bearing speed and the angular velocity determine the vector during revolution—no purely tangential relative feed takes place during revolution of crankshaft 1; instead, a radial component 36—illustrated in exaggerated size—is superposed on tangential component 35, resulting in relative feed 37 illustrated in vector form during the revolution of crankshaft 1. During the lead-in cut, infeed movement 38 of end-milling cutter 12 along its longitudinal axis 17 (in X direction) is added thereto. The relative feed resulting from superposition with vector 37 during the lead-in cut is illustrated by the corresponding lead-in cut or insertion vector 39. During exit of end-milling cutter 12 after complete revolution of crankshaft 1, infeed movement 40—which takes place in X direction—of end-milling cutter 12 is added to relative feed 37. The relative feed resulting from superposition with vector 37 during exit of end-milling cutter 12 is illustrated by the corresponding exit vector 41. The respective size of infeed movements 38 and 40 is determined experimentally in advance, in which connection direction of rotation 20 of crankshaft 1 either in or opposite to the direction of offset e of end-milling cutter axis 17 relative to axis of rotation 2 of crankshaft 1 must be taken into consideration. As reference point for determination of the order of magnitude of the infeed speed as a function of the other machining parameters as well as of the geometric relationships, there can be used the fact that the lead-in cut preferably extends over an angular interval of 3° to 15° of rotation of crankshaft 1. This is equally true for main bearings HL and rod bearings PL.

At the beginning of chip-removing precision machining during roughing-cut turn-milling and/or during finishing-cut, turn-milling takes place in the region of an oil bore.

As already mentioned, crankshaft 1 is braced by one or two steadies (not shown) of the machine tool during multi-stage chip-removing turn-milling machining of a main bearing HL. Bracing is provided primarily in the X-direction, which is illustrated in vertical direction in FIG. 7. A sliding block 25, which is movable in both directions 26 along the X-axis, is used for bracing. In addition to bracing in the X-direction by sliding block 25, additional bracing is provided by two further sliding blocks 27 and 28, which can be moved respectively in radial directions 29 toward and back away from main bearing seat HL of crankshaft 1. A mechanism (not shown) of the steady coordinates the three movements 26 and 29 in such a way that sliding blocks 27 and 28 move onto main bearing HL, while sliding block 25 moves downward in the direction of double arrow 26. Conversely, sliding blocks 27 and 28 move away from main bearing HL in the direction of double arrow 29, while sliding block 25 moves upward in the direction of double arrow 26. A mechanism that is known in itself and that does not have to be further described here provides for coordination of movements 26 and 29, whereby centered clamping of crankshaft 1 is achieved for different diameters of the bearing seats.

Figure 7:
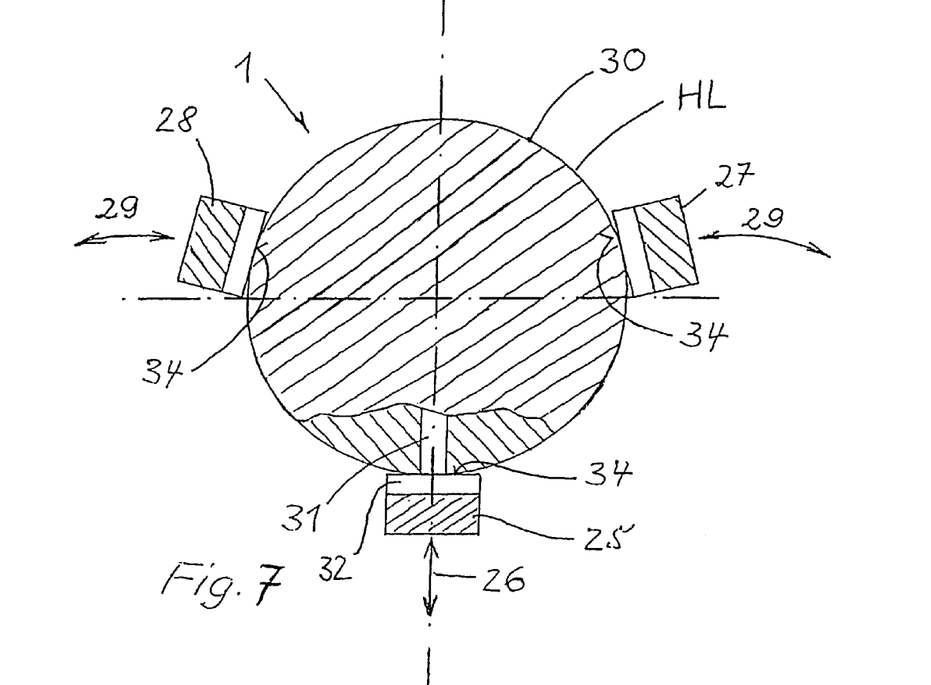
FIG. 7 shows the bracing of another main bearing in section and FIG. 8 shows the top view of a sliding block of the steady.
Figure 8:
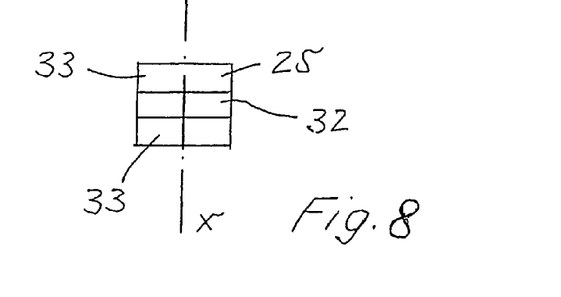

However, bearing seat 30 of main bearing HL is also interrupted by an oil bore 31. Disturbances can be caused by the rim of this oil bore 31, and they appear during rotation of crankshaft 1, while main bearing HL is being braced by sliding blocks 25, 27 and 28. To avoid such disturbances, sliding blocks 25, 27 and 28 are each provided with a groove 32. The effect of groove 32 is that the bracing portion 33 of the total supporting face of sliding blocks 25, 27 and 28 is smaller than their respective cross-sectional face 34 turned toward main bearing HL during bracing. What is not illustrated in the drawing is the possible adaptation of the sliding blocks to the generating line of the bearing seat to be manufactured by means of a negative crown (see hereinabove).

Figure 11:
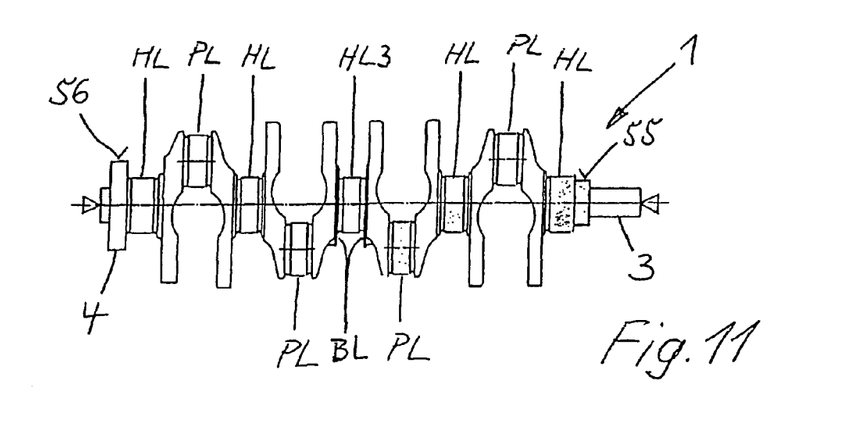
FIG. 11 shows the side view of a crankshaft with the preferred positions for smooth rolling.
Figure 12:
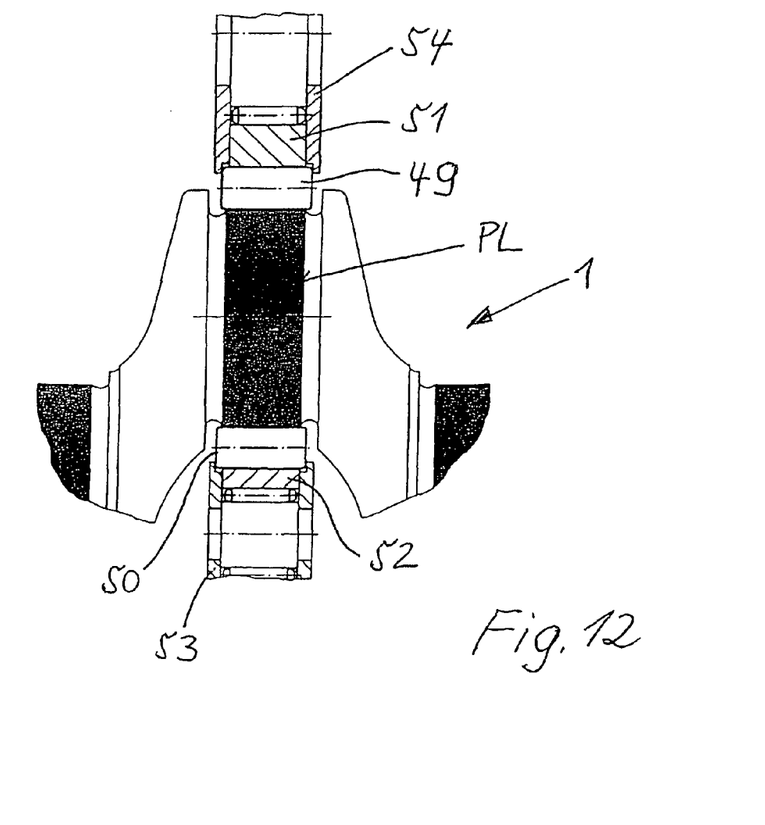
FIG. 12 shows the point of attack of a smooth-rolling tool on a rod-bearing journal.

The preliminary machining operations of roughing-cut and finishing-cut turn-milling can also be followed optionally, or in other words as needed, by the operation of smooth rolling of bearing seats HL and PL (FIG. 11 and FIG. 12).

FIG. 11 shows the orientation, on a crankshaft 1, of bearing seats HL and PL, which preferably are to be smooth-rolled. Shoulder faces BL of thrust bearing HL 3 of a crankshaft 1 are also preferably smooth-rolled; however, these machining operations no longer fall under the present invention and are mentioned herein merely for completeness. The smooth-rolling of bearing seats HL and PL is accomplished by stone or manually instead of by finishing.

Smooth-rolling is accomplished with three cylindrical smooth-rolling rolls, which are distributed over the circumference of bearing seat PL. Of those, only the two smooth-rolling rolls 49 and 50 are visible in FIG. 12; for better understanding, the third was shifted back into the drawing plane. Each smooth-rolling roll 49 and 50 is supported laterally by two respective support rolls 51 and 52, which are also swiveled into the drawing plane here. As is evident, support rolls 51 and 52 in turn are mounted to rotate in housings 53 and 54 respectively. During smooth rolling, crankshaft 1 is rotated, thus causing smooth-rolling rolls 49 and 50 to revolve; in turn, smooth-rolling rolls 49 and 50 cause support rolls 51 and 52 to revolve at the same time. During smooth-rolling, smooth-rolling rolls 49 and 50 are pressed at a predetermined rolling force onto bearing seat PL of crankshaft 1.

Because of smooth-rolling, there is imparted to bearing seats HL and PL an improved surface characteristic, which does justice to their function. The residual roughness remaining after precision turn-milling is reduced. The percentage contact area of the profile and the hardness of the skin film are increased. The torsional strength of crankshaft 1 is greater. Finally, even deviations of form that may still exist are reduced.

Preferably, sealing faces 55 at journal 3 and 56 at flange 4 are also smooth-rolled on each crankshaft 1, FIG. 11. The method described in the foregoing is suitable not only for machining of crankshafts but also for machining of camshafts and side shafts of all kinds in the same way.

Figure 13:
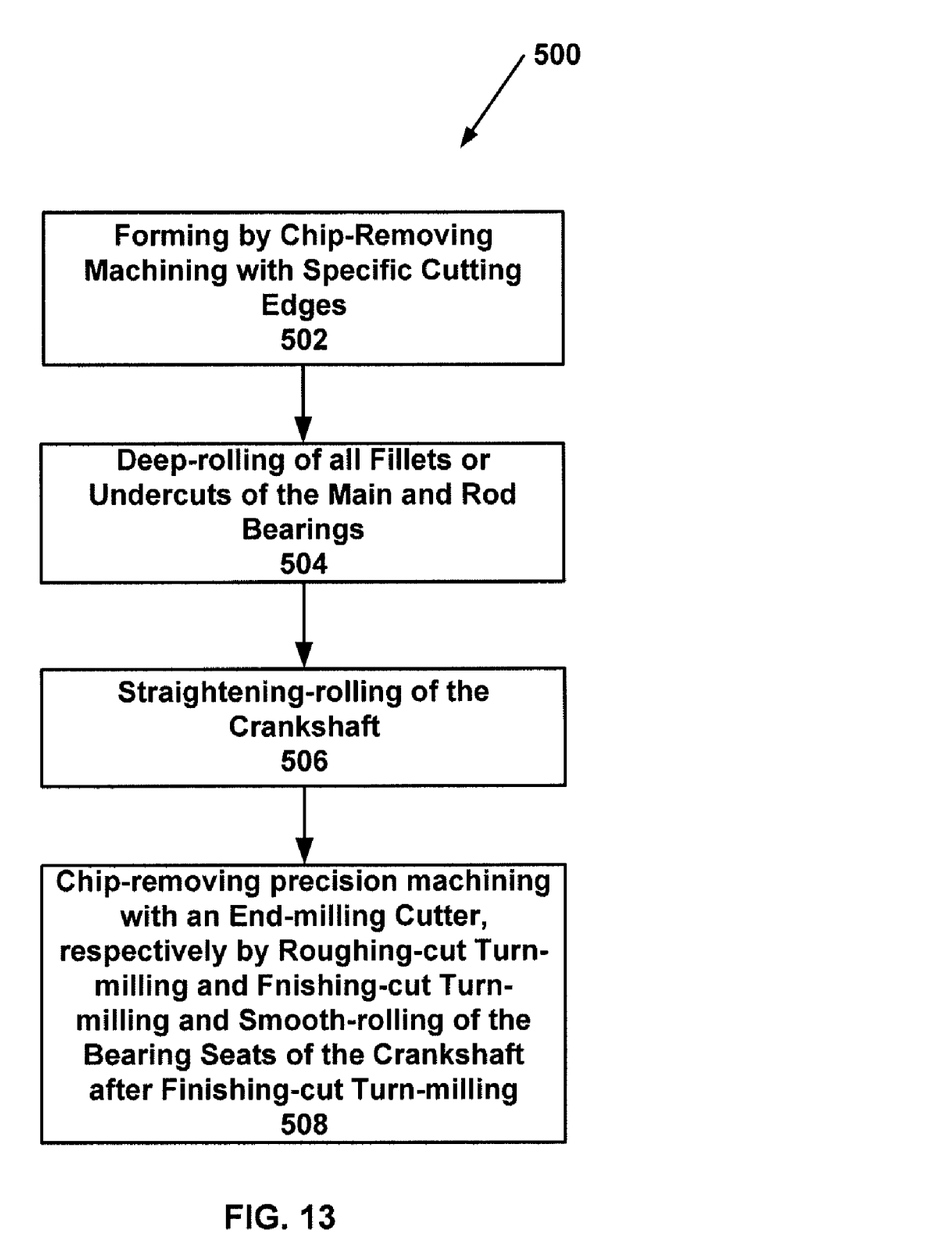
FIG. 13 is a block diagram illustrating the steps of the present invention.
Figure 14:
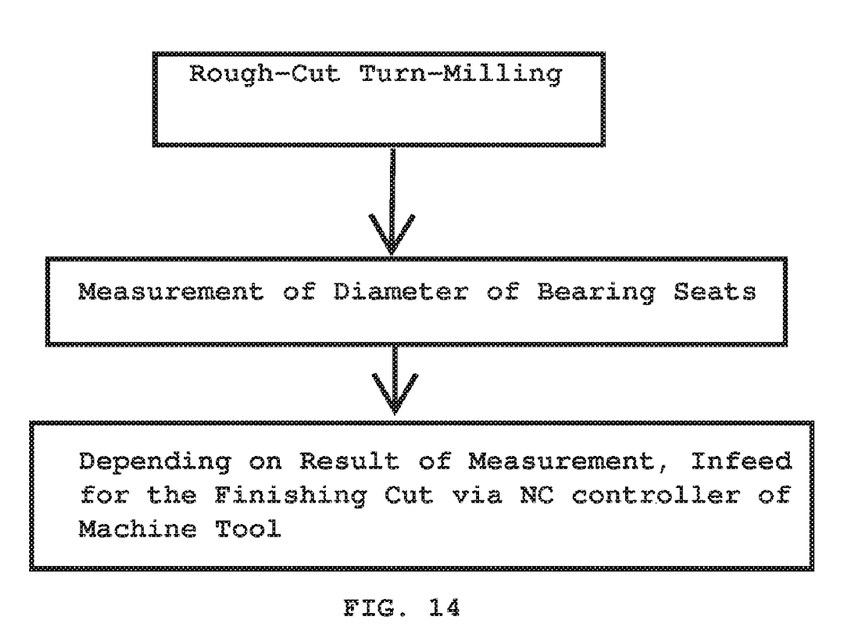
FIG. 14 is a block diagram illustrating steps of the present invention.
Figure 15:
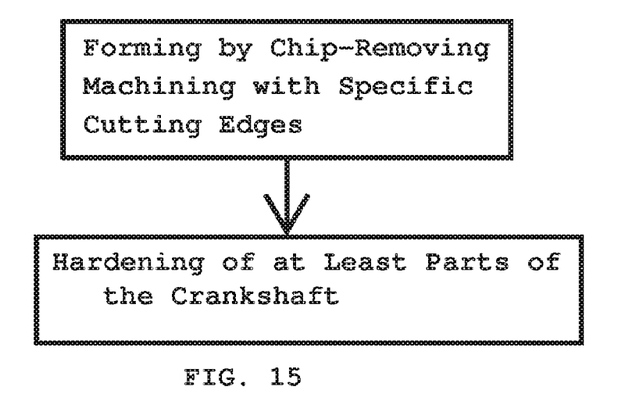
FIG. 15 is a block diagram illustrating steps of the present invention.

As illustrated by FIG. 13, a method 500 for machining the bearing seats of the main and rod bearings of crankshafts, wherein the bearing seats of the main and rod bearings, after primary forming of the crankshaft by forging or casting, includes the following machining operations:

502 forming by chip-removing machining with specific cutting edges,     504 deep-rolling of all fillets or undercuts of the main and rod bearings,     506 straightening-rolling of the crankshaft,     508 chip-removing precision machining with an end-milling cutter, respectively by roughing-cut turn-milling and finishing-cut turn-milling and smooth-rolling of the bearing seats of the crankshaft after finishing-cut turn-milling.

The invention claimed is:

1. A method for machining bearing seats of a main bearing and a rod bearing of a crankshaft having a longitudinal axis, wherein the bearing seats, after primary forming of the crankshaft by forging or casting, are subjected to the following machining operations:

forming by a chip-removing machining with specific cutting edges,     performing a deep-rolling of all fillets or undercuts,     performing a straightening-rolling of the crankshaft,     performing a chip-removing precision machining with an end-milling cutter, respectively by a roughing-cut turn-milling and a finishing-cut turn-milling, respectively during substantially one complete revolution of the crankshaft without longitudinal feed, and without tangential feed, relative to a tangential surface of the respective bearing seat, of the end-milling cutter, and a smooth-rolling after the finishing-cut turn-milling.

2. A method according to claim 1, wherein a diameter of the bearing seats is measured after the roughing-cut turn-milling and, depending on the result of the measurement, an infeed for the finishing cut is then undertaken via an NC controller of a machine tool.

3. A method according to claim 1, wherein the chip-removing machining with specific cutting edges is followed by a hardening of at least parts of the crankshaft.

4. A method according to claim 1, wherein an infeed of the end-milling cutter during insertion at the beginning of the roughing-cut turn-milling and at a beginning of the finishing-cut turn-milling takes place, relative to an axis of rotation of the end-milling cutter, solely in a direction of the axis of rotation of the end-milling cutter.

5. A method according to claim 4, wherein a lead-in cut during an insertion of the end-milling cutter extends from 3° to 15° of an angle of rotation of the crankshaft.

6. A method according to claim 5, wherein the angle of rotation of the crankshaft is 5°.

7. A method according to claim 1, wherein a relief groove is made, during forming of the crankshaft, on two sides of at least one of the bearing seats to be generated.

8. A method according to claim 1, wherein the roughing-cut turn-milling and the finishing-cut turn-milling take place with an offset of an axis of rotation of the end-milling cutter relative to an axis of rotation of the respective bearing seat equal to approximately 0.15 to 0.2 times the value of a diameter of the end-milling cutter.

9. A method according to claim 8, wherein the crankshaft further comprises a plurality of rod bearings and wherein a plurality of bearing seats of the rod bearings are to be machined, wherein the bearing seats of the rod bearings of the crankshaft are machined by machining each individual bearing seat of the rod bearings successively with the end-milling cutter, the end-milling cutter being the only end-milling cutter, while the crankshaft is braced simultaneously in a radial direction with respect to the longitudinal axis of the crankshaft by a steady on a respective adjacent main bearing.

10. A method according to claim 1, wherein the crankshaft further comprises a plurality of main bearings and wherein a plurality of bearing seats of the main bearings are to be machined, wherein the bearing seats of the main bearings are machined by machining each individual bearing seat of the main bearings successively with the end-milling cutter, the end-milling cutter being the only end-milling cutter, while the crankshaft is braced simultaneously in a radial direction with respect to the longitudinal axis of the crankshaft by a steady on a respective adjacent main bearing.

11. A method according to claim 1, wherein the finishing-cut turn-milling comprises a step of rotating the crankshaft by an angle of more than 360°.

12. A method according to claim 1, wherein a beginning of the chip-removing precision machining during the roughing-cut turn-milling and/or during the finishing-cut turn-milling takes place in a region of an oil bore.

\* \* \* \* \*